June 30, 1970  L. THORNTON  3,517,477
ARTICLE HANDLING APPARATUS
Filed Oct. 6, 1967  2 Sheets-Sheet 1

INVENTOR
Leonard Thornton
BY

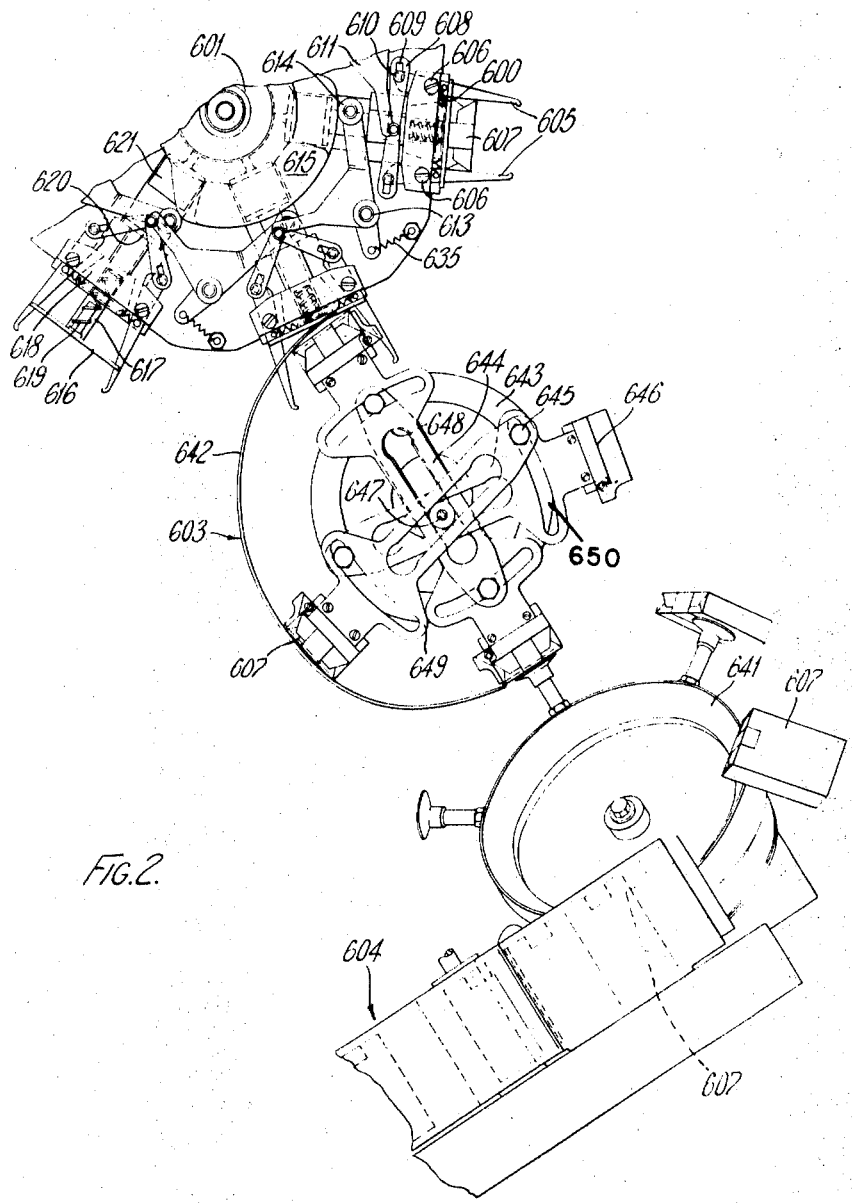

United States Patent Office 3,517,477
Patented June 30, 1970

3,517,477
ARTICLE HANDLING APPARATUS
Leonard Thornton, London, England, assignor to Molins Machine Company Limited, London, England, a corporation of Great Britain
Filed Oct. 6, 1967, Ser. No. 673,502
Int. Cl. B65b *57/02*
U.S. Cl. 53—53     18 Claims

ABSTRACT OF THE DISCLOSURE

A rotary table has a number of handling mechanisms which grab packets of cigarettes issuing in a stream from a cigarette-packing machine; springs push faulty packets along the grabs to a position where they are removed by a scoop whilst electromagnets hold good packets back against the springs so that they pass clear of the scoop to be released by the grabs. A decelerator is provided to take the packets from the rotary table, slow them down and move them closer together.

CROSS-REFERENCE

Reference is made in this specification to U.S. patent application Ser. No. 590,153 filed Oct. 4, 1966 which discloses a machine with which the apparatus of this invention may conveniently be used.

BACKGROUND OF THE INVENTION

This invention relates to improvements in article-handling apparatus and is particularly, although not exclusively, concerned with apparatus for handling the output of a cigarette-packing machine which produces a continuous stream of packets of cigarettes.

It is usually desirable to reject from the stream packets which are faulty or which are incomplete before the packets proceed to the next stage which is usually that of wrapping the packets in cellophane. In the particular case of high output packing machines such as, for example, the rotary machine described in U.S. patent application Ser. No. 590,153 filed Oct. 4, 1966 difficulties may arise in performing the operation of rejection by the method of moving a faulty packet of the stream, without fouling adjacent, good packets with the rejection mechanism since the time interval during which a packet passes the rejection mechanism is very short. In addition it may sometimes happen that the faulty "packet" consists only of a few cigarettes or even just a piece of paper and foil and further difficulty may arise in effectively removing this from the packet.

It is one object of this invention to provide an improved article handling apparatus which is particularly, although not exclusively, suitable for handling the output of a cigarette-packing machine.

SUMMARY OF THE INVENTION

According to one aspect of the present invention there is provided article-handling apparatus including a plurality of handling mechanisms arranged for movement in continuous succession past an article supply station, each mechanism comprising means to receive an article from the supply station, means to reject a faulty article at a rejection station and means to release a good article at an output station.

The means to reject a faulty article can be actuated by a signal received from one or more faulty article detectors which, if the supply station is the output of a packing machine are, conveniently, located on that machine, and preferably the said means is operable in response to said detector signal to move the article, if it is indicated as faulty, into engagement with means which acts to remove the article from the rejection means. Preferably also the rejection means is spring-actuated and controlled by an electro-magnetic device.

In one embodiment of the invention the handling mechanisms are disposed at regular intervals around a rotary table arranged in relation to a packing machine continuously to remove all the packets therefrom in succession. Also each rejector has an ejector member to engage the packet, spring means acting to urge said member to eject the article, an electromagnet keeper movable with said ejector member and an electromagnet energisable to hold the keeper against movement under the action of said spring means. In addition the rejector includes a pair of jaws to embrace the packet and a transfer device is provided to co-operate with the packing machine to remove packets therefrom and to introduce them between the pairs of jaws. This device can conveniently include means to push the packets down between the jaws against the ejector member and the action of said spring means.

BRIEF DESCRIPTION OF THE DRAWINGS

Some embodiments of the invention will now be described, by way of example, with reference to the accompanying drawings in which:

FIG. 2 is a similar view of modified apparatus.

DETAILED DESCRIPTION OF THE DRAWINGS

Figure 1:
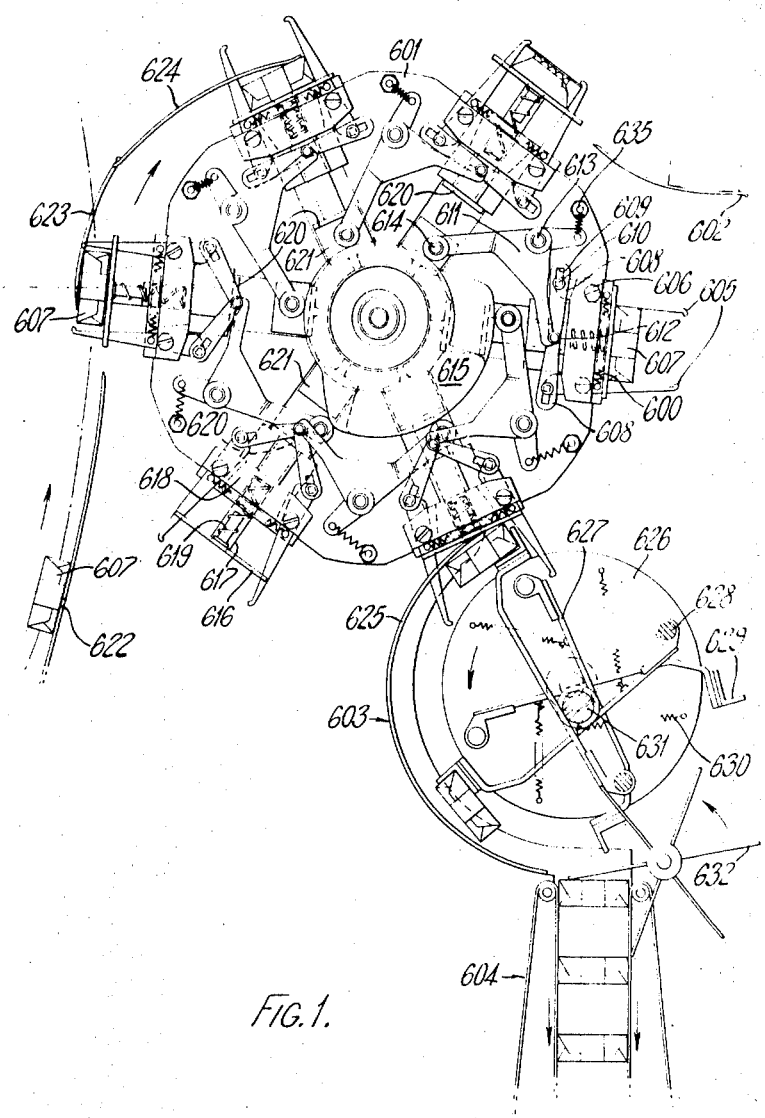
FIG. 1 is a plan view of apparatus for taking packets off a cigarette-packing machine and rejecting faulty packets.

The devices of this invention are well-suited to the removal of packets from the rotary packing machine described and claimed in U.S. patent application Ser. No. 590,153, filed Oct. 4, 1966. When used with the packet described therein the device is positioned with the eentre of the rotary table on the line 223 of FIG. 12 of the drawings accompanying that application, in place of the packet take-off mechanism 158 and the rejector gate 427 with its associated guides 431 and 432. It will be seen that the decelerator 603 is of substantially the same construction as the packet take-off mechanism 158 shown in FIG. 12 of the drawings accompanying that specification.

Referring to FIG. 1 of the accompanying drawing the apparatus comprises six packet-ejector mechanisms disposed at regular intervals around a rotary table 601 which is positioned relatively to a packing machine so that the ejectors can grab completed packets from the packer. As the table 601 rotates each ejector mechanism receives a packet from the packing machine and is then operated, according to whether the packet is a good one or a faulty one, either to reject a packet which is indicated as being faulty to the scoop 602, or else to pass a packet which is good to a rotating decelerator mechanism, indicated generally at 603, and thence to a packet conveyor, indicated generally at 604, which removes the packets in a straight line to a wrapping machine.

Each ejector mechanism is provided with a pair of jaws 605 pivoted at 606 to grip cigarette packets such as 607 or faulty packets which may only comprise loose paper, foil or cigarettes. The movement of the jaws 605 is controlled by a tension spring 600 connected across them to urge them to close and a pair of links 608 each of which is slotted at one end 609 to receive a spigot 610 carried on the inner end of one of the jaws 605. The other ends of the pair of links 608 are pivoted together and to one end of a bell crank level 611, at 612. The lever 611 is also pivoted to the table 601, at 613, and carries on the end of its other arm a cam follower 614 which is urged into engagement with a cam 615 by means of a spring 635. Cam 615 is stationary and is formed into two parts to be adjustable, so as thereby to provide means for varying the timing of the opening and closing of jaws 605. Each ejector mechanism also comprises an ejector plate 616 which extends across the jaws and is slotted to receive them, and which is radially movable on a shaft 617 extending through a mounting 618 to which the jaws 605 are pivoted at 606, and resiliently urged outwards by means of a helical spring 619 acting against the mounting 618. The other end of the shaft 617 terminates in a keeper plate 620 for an electromagnet 621 disposed beneath the paw-actuating mechanism.

A curved guide plate 622 is positioned to retain the packets in position whilst they remain in the packet holders of the packing machine and extends to the take-off point. At this point a fixed plough 623 is positioned to engage behind the packets in the packet holders on the packing machine to prise them therefrom. A pressure plate 624 is adjustably secured to the trailing end of the plough 623 and acts to push the packets against the ejector plate 616 and down between the jaws 605 against the action of the spring 619.

The decelerator mechanism 603 shown in FIG. 1 has a curved scoop and guide plate 625 which is flanged at its lower edge to support the packets 607 and which is slotted along its length to receive the jaws 605. Embraced by the guide plate 625 is a rotary disc 626 on which four pusher arms, such as 627, are pivotally mounted at equi-spaced points such as 628. Two of these arms 627 are secured directly to the disc 626 by pins, whereas the other two are secured by cantilevered overhead supports that are not shown. The end of each arm 627 terminates in a right-angled bracket 629 which engages the side walls of the packets and pushes them along the guide 625. The pivotal movement of each arm 627 is controlled by means of springs such as 630, which urge the arms into engagement with a stationary eccentrically mounted shaft 631. The effect of this arrangement is that as the disc 626 rotates in an anti-clockwise direction the packet-engaging brackets 629 accelerate from the five o'clock to the eleven o'clock position, where a packet is engaged, and then decelerate round to the five o'clock position. At the exit from the decelerator a paddle wheel 632 is mounted, for anticlockwise rotation, and operates to push the packets 607 onto the conveyor 604.

The operation of this packet take-off and rejector mechanism will now be described. Since the packing machine is rotating at twenty-five revolutions per minute and comprises twenty-four packing mechanisms the ejector table 601 is rotated at one hundred revolutions per minute so as to remove packets from the packing machine at the rate of six hundred per minute. The phasing is synchronized with that of the packing machine so that as a packet moves along the guide rail 622, the jaws 605 move in to embrace the packet. The cam 615 is shaped and arranged so that prior to engagement with the packet the jaws 605 are open and so that when the packet has been embraced they close to grip it. As the ejector mechanism rotates from position 623, a packet 607 moves along the plough 623 and comes into engagement with the pressure plate 624 which pushes the packet down between the jaws 605 against the action of the spring 619 and thereby brings the keeper plate 620, on the end of the shaft 617, into engagement with the electromanget 621. It is at this point that the rejection operation commences. If the packet is a good one then the electromagnet 621 is energised, thereby retaining the ejector plate 616 depressed against the spring 619 so that the packet 607 can advance past and behind the scoop 602. If however any one of the detectors which are positioned at various points in the packing machine has indicated that a packet will be faulty then the electromagnet 621 is not energised. As a result, as soon as the packet moves clear of the pressure plate 624, the spring 619 acts to push it out of the end of the jaws 605 where it moves into engagement with the scoop 602 which tears it out from between the jaws 605.

Having by-passed the rejector scoop 602 the good packets move round to engage the end of the scoop and guide 625. At this point the cam 615 and the follower 614 co-operate to open the jaws 605. The decelerator 603 is rotated at one hundred and fifty revolutions per minute and synchronised with the rotary table 601 so that as a packet arrives at the upstream end of the guide 625 its trailing side is engaged by one of the pusher brackets 629 and is pushed along the guide 625 with a decelerating action which brings the packets closer together, to the paddle wheel 632 which pushes the packets out on to the conveyor 604 in a straight line at regular, close intervals.

In the embodiment of FIG. 2 the construction of the decelerator mechanism 603 is modified, although its mode of operation remains substantially the same, and the paddle wheel 632 is replaced by a suction-operated packet turning apparatus 641, the details of which are disclosed in U.S. application Ser. No. 700,757 filed Jan. 26, 1968 and which delivers the packets to the conveyor 604, which is here somewhat modified, lying on their side. The use of the packet-turning apparatus 641 enables the conveyor 604 to be at a different height from the decelerator 603 and also allows it to be positioned at various angles. This is of considerable advantage in planning the layout of the machinery in the factory.

The modified decelerator 603 of this figure comprises a curved guide rail 642, which in this case is not slotted or flanged, and a rotary table 643 on which there are mounted four arms 644 each of which is pivoted at one end 645 to the periphery of the table, extends across the table and carries at its other end an open basket 646 to receive the packets 607. An upstanding shaft 647 is mounted eccentrically of the centre of the rotary table 643 and is stationary relative thereto; each of the arms 644 is formed with a slot 648 to receive the shaft 647 and they co-act therewith to control the pivoting of the arms 644 so that they accelerate from the fixe o'clock to the eleven o'clock position and decelerate from there back to the five o'clock position. The movement of the arms 644 is stabilised by an enlarged portion 649 which is formed with an arcuate slot 650 to receive the pivot 645.

What I claim as my invention and desire to secure by Letters Patent is:

1. Article-handling apparatus for transporting articles and separating faulty from good articles including a plurality of handling mechanisms arranged for movement in continuous succession past an article supply station, each mechanism comprising:
    (a) article-receiving means to receive an article from the supply station,
    (b) rejection means responsive to a signal indicating the presence of a faulty article to cause said faulty article to be rejected at a rejection station, and
    (c) means to release a good article at an output station.

2. Apparatus acording to claim 1, comprising detector means responsive to the presence of faulty articles to generate said signal to actuate the rejection means.

3. Apparatus according to claim 1, comprising removal means at said rejection station to remove faulty articles from the receiving means wherein the rejection means acts to move faulty articles into engagement with the removal means.

4. Apparatus according to claim 3 wherein the rejection means is spring biased and actuation is controlled by an electro-magnetic device.

5. Apparatus according to claim 1 wherein the handling mechanisms are disposed at regular intervals around a rotatably mounted table arranged in relation to the article supply station to remove articles continuously therefrom in succession.

6. Apparatus according to claim 1 wherein each article-receiving means comprises a set of pivotably mounted jaws and means to move said jaws together to engage and grip an article and apart to release the article, and wherein each rejection means comprises an ejector member and means for moving said ejector member to push the articles retained between the jaws to a rejection position.

7. Apparatus according to claim 6 wherein the means to move each of said jaws comprises a cam which is stationary relatively to the movement of the handling mechanisms and a cam follower operatively connected to each of said jaws.

8. Apparatus according to claim 1 comprising a stationary transfer device at the article supply station to assist in removing articles therefrom and introducing them to the article-receiving means.

9. Apparatus according to claim 1 comprising decelerating means to receive articles released from said handling mechanisms and deliver them in a slower moving stream.

10. Apparatus according to claim 9 wherein said decelerating means comprises a further plurality of handling mechanisms arranged for movement in continuous succession past said output station, each further mechanism comprising further article-receiving means to receive an article from the output station, decelerating means to reduce the speed of movement of the articles and means to release the articles at a further output station.

11. Apparatus according to claim 10 wherein the further article-receiving means comprises a plurality of pushers aranged for movement along a closed path and means to decelerate said pushers at one stage of that path and accelerate said pushers at another stage, said pushers being disposed for the articles to be engaged by the pushers during the deceleration stage.

12. Aparatus according to claim 11 wherein said decelerating means comprises a pivotably mounted arm attached to each pusher and a fixed member which engages the arm to control its pivoting.

13. Apparatus according to claim 11 wherein the pushers are carried on a rotatably mounted table.

14. Apparatus according to claim 10 wherein said fur,ther output station comprises a conveyor for receiving the slower moving articles and means to transfer the articles one at a time from the decelerating means to the conveyor.

15. Apparatus according to claim 1 further comprising conveyor means for supporting and moving said handling mechanisms past said article supply station.

16. A take-off mechanism for a cigarette packing machine comprising rotary means for carrying packets off the packing machine along a curved path leading to receiving means to which good packets are delivered, and including means for operating automatically in response to a test signal from the cigarette packing machine to eject faulty packets and to deliver the faulty packets to a faulty packet receiving means, said faulty packet ejector means being mounted in a position which, in relation to the movement of good packets, is upstream of the position at which the rotary means delivers good packets to the first-mentioned receiving means.

17. A take-off mechanism for a packaging machine comprising rotary means for carrying packages off the packaging machine along a curved path, good package receiving means located along said path for accepting good packages, faulty package receiving means, and ejection means responsive to a test signal from said packaging machine for ejecting faulty packages to said faulty package receiving means, said faulty package receiving means and ejection means being located upstream of said good package receiving means.

18. A rotary take-off apparatus for delivering filled packets from a packing machine, comprising a plurality of handling mechanisms arranged to receive packets in succession from a packing machine, each mechanism comprising:
 (a) packet-receiving means to receive and hold a packet,
 (b) means to cause a faulty packet to be rejected at a rejection station in response to a signal from the packing machine, and
 (c) means to release a good packet at an output station.

References Cited
UNITED STATES PATENTS

| 2,847,807 | 8/1958 | Brook | 53—53 |
| 2,922,445 | 1/1960 | Osmond et al. | 209—74 X |
| 3,008,577 | 11/1961 | Miles | 209—74 |

TRAVIS S. McGEHEE, Primary Examiner

U.S. Cl. X.R.
198—209; 209—74